(No Model.) 2 Sheets—Sheet 1.

D. J. & L. D. NORRIS.
WEIGHING WAGON.

No. 263,201. Patented Aug. 22, 1882.

WITNESSES:
Chas. Nida
C. Sedgwick

INVENTOR:
D. J. Norris
L. D. Norris
BY Munn & Co
ATTORNEYS.

(No Model.) 2 Sheets—Sheet 2.

D. J. & L. D. NORRIS.
WEIGHING WAGON.

No. 263,201. Patented Aug. 22, 1882.

WITNESSES:
Chas. Nida
C. Sedgwick

INVENTOR:
D. J. Norris
L. D. Norris
BY
Munn & Co
ATTORNEYS.

ically caused by the defect of a moderate increase or decrease of the load of platform D at one side, or when the load is unevenly distributed. To save the trouble of evenly dispose of the load, which may be very inconvenient, we provide the scale-beam Y with a sliding balance-weight, e, having a sliding rod, d, extending crosswise of the scale-beam and provided with a weight or ball, f, at one end and a set-screw, g, for holding it in place. This balance device is shown in detail in Fig. 3.

UNITED STATES PATENT OFFICE.

DANIEL J. NORRIS AND LUCIUS D. NORRIS, OF ODELL, NEBRASKA.

WEIGHING-WAGON.

SPECIFICATION forming part of Letters Patent No. 263,201, dated August 22, 1882.

Application filed April 27, 1882. (No model.)

*To all whom it may concern:*

Be it known that we, DANIEL J. NORRIS and LUCIUS D. NORRIS, of Odell, in the county of Gage and State of Nebraska, have invented a new and Improved Weighing-Wagon, of which the following is a full, clear, and exact description.

This invention consists of a platform with a compound-lever weighing apparatus attached and being arranged to fit upon a wagon-bed and having the weighing apparatus coupled with cranked rods so arranged in bearings upon the bed that the rods being turned into one position the platform will be suspended on the pivots of the weighing apparatus for weighing purposes, and being turned in another position the support of the bed will be transferred to the rods and the pivots relieved of it and also relieved from any bearing contact, and so be protected from wear, the platform then serving the purpose of a bed to the ordinary wagon-box.

The invention also consists of a contrivance of adjusting balance device and register therefor to the scale-beam for indicating whether the balance of the platform is correct or not, and for correcting it when required.

The invention also consists of side pieces hinged to the sides of the platform to serve for the wagon-box sides, and also to widen the platform, so that when placed on the ground a wagon can be drawn upon it to be weighed.

The object of the invention is to provide a simple, cheap, and convenient apparatus for weighing purposes, whereby the load can be weighed at once when put on the wagon wherever it may be and without having to spend time and labor going to and from the common local scale, all as will be hereinafter more fully described.

Reference is to be had to the accompanying drawings, forming a part of this specification, in which similar letters of reference indicate corresponding parts in all the figures.

Figure 1:
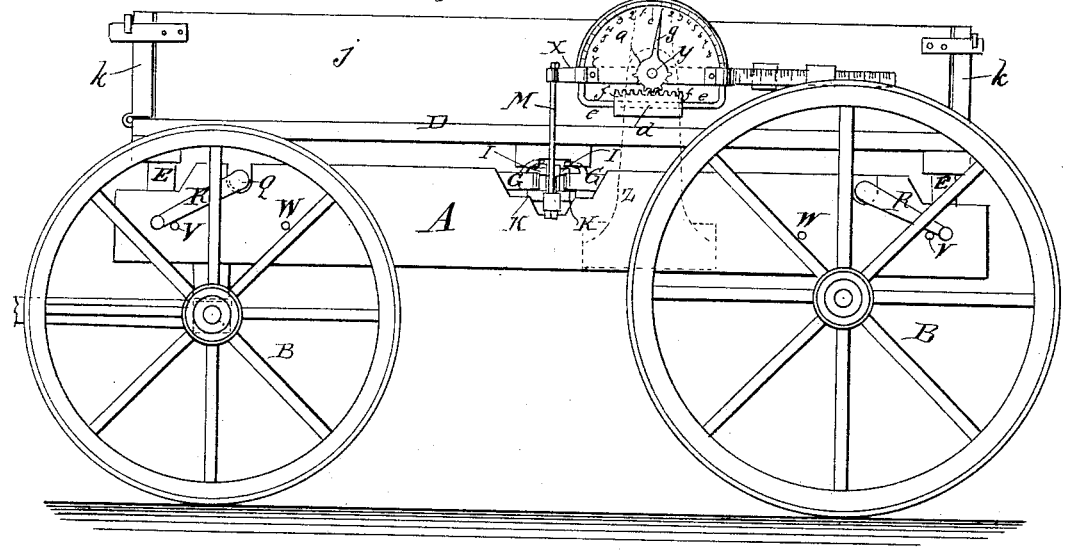
Figure 2:
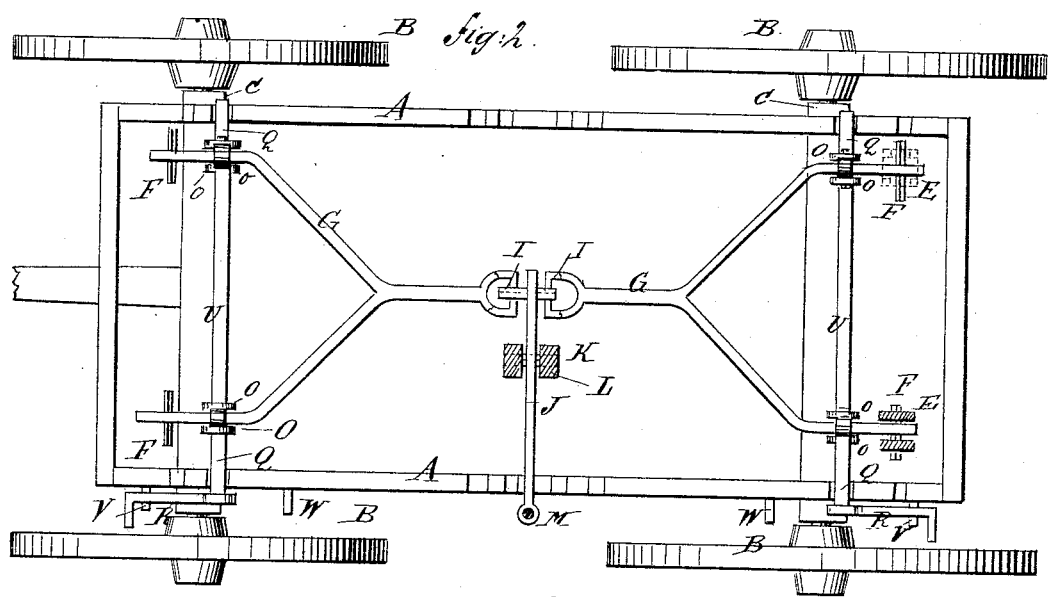
Figure 3:
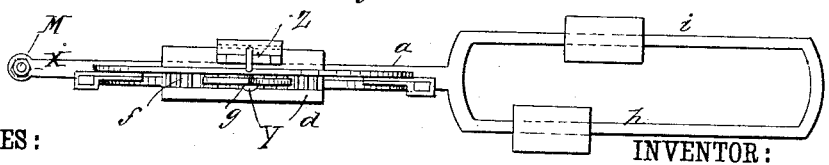
Figure 4:
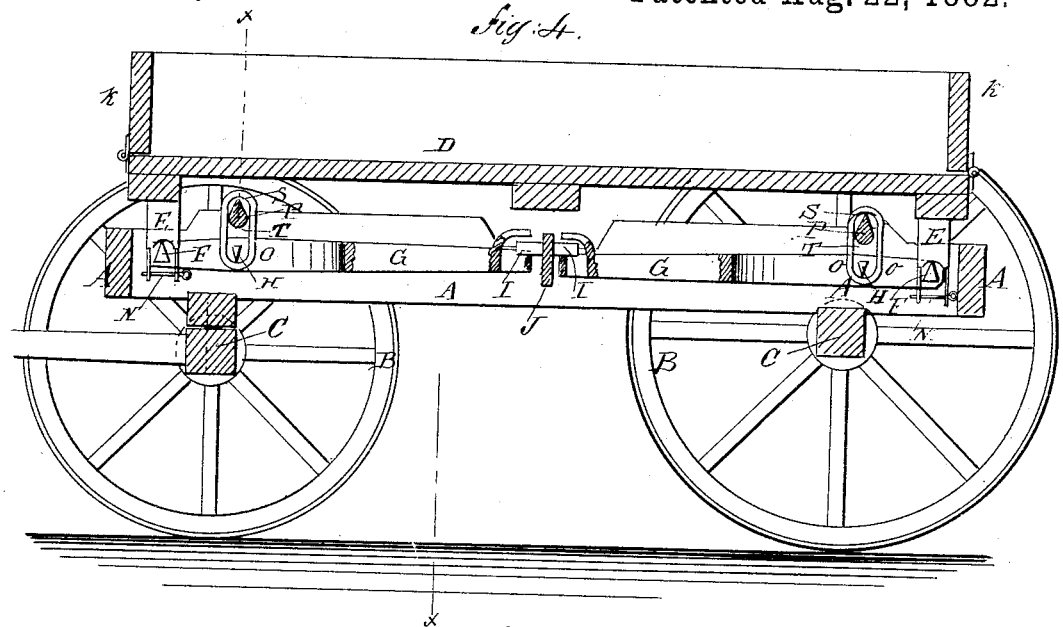
Figure 5:
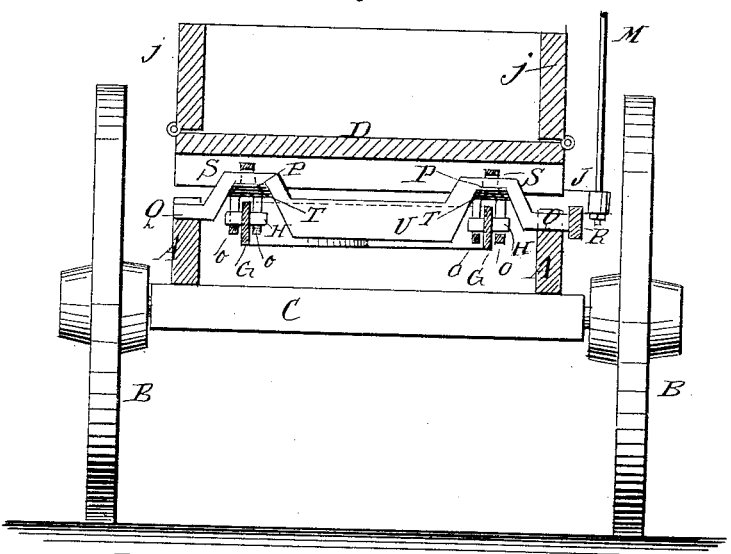

Figure 1 is a side elevation of our improved weighing-wagon, the platform being suspended on the weighing apparatus. Fig. 2 is a plan of the levers, also the crank-rods by which they are adjusted, and also of the running-gear of the wagon and the bed thereon for supporting the cranked rods. Fig. 3 is a plan of the weigh-beam, balance-weight, indicator, and register. Fig. 4 is a longitudinal sectional elevation of Fig. 1. Fig. 5 is a transverse sectional elevation of Fig. 4 on line *x x*, and Fig. 6 is a transverse section on line *x x*, Fig. 4, showing the platform let down and resting on the cranked rods, as when the weighing apparatus is not in use.

A represents a suitable bed-frame mounted on the wheels B and axles C of a farm-wagon, over which is a platform, D, of suitable size and construction, to serve as the bed or bottom portion of a wagon-box and at the same time being the platform of a weighing-scale. At each of the four corners of this platform D and from the under side there is a stout leg, E, of substantial construction, rigidly attached, to serve for the bearers by which the platform is supported on the pivots F of the short arms of the forked weighing-levers G, whose fulcrum-pivots are at H and long-arm pivots at I in the short arm of the second lever J, which has its fulcrum-pivots K in a hanger, L, from the under side of the platform D and its long arm suspended from the short arm of the weigh-beam by a rod, M.

The aforesaid legs or beams E have their lower ends notched deep enough to receive a pin, N, under the lever-pivots F, for suspending the levers G by said pivots when not in weighing condition, to relieve pivots H, I, and K from wear by the jolting of the wagon, as will be described farther on.

Figure 6:
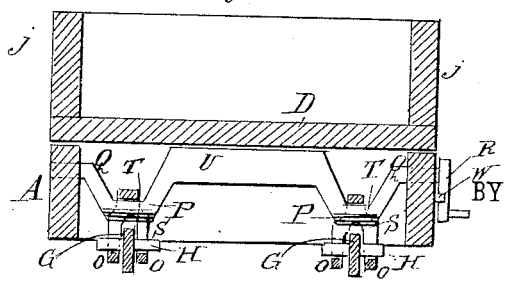

The levers G are connected by their pivots H and by links O with the cranks P of rods Q, extending across the bed-frame A and having bearings in the timbers thereof, as shown in Figs. 5 and 6, and also having a hand-crank, R, at one end for adjusting them. These cranks P present knife-edge pivots at S for the support of the links when turned up, as shown in the weighing-position, Figs. 1, 2, 4, and 5, as it is desirable, to suspend the scale-beams for sensitiveness; but when turned down the links O hang upon the rounded sides T of cranks P. On the side of these cranked rods opposite to the knife-edges S they are constructed along the middle portion, U, in eccentric extension from the center sufficiently to receive the platform thereon and support it when the cranks P are turned down, as in Fig. 6, to dispense with the weighing apparatus. In Figs. 1 and 2 the positions of the hand-cranks R are shown as when the platform D and levers G are in weighing position, the cranks then resting on stud-pins V. They will turn over upon pins W when the weighing apparatus is not in use.

The weigh-beam X has its fulcrum Y in the bracket Z at outside of and projecting above the platform A, to which bracket Z is attached for the support of the weigh-beam. The beam X has a dial, $a$, with a balance-pointer, $b$, attached, so as to swing with it, also a balance-weight, $d$, the latter being fitted to slide along the rod $e$, fixed to beam X and having teeth $f$, gearing with the hub of a pointer, $g$, turning on center Y around dial $a$, and a scale marked thereon. When pointer $b$ is at the zero-mark, 0, on bracket Z the scale should be balanced with pointer $g$, also at the zero-mark, 0, on the dial $a$; but if the pointer $g$ is not so set when the balance-weight has been shifted to balance the weigh-beam, then the difference will be shown on dial $a$. In shifting the balance-weight to cause pointer $b$ to register properly the pointer $g$ will always indicate the position of the balance-weight and show whenever the weight of the platform is changed.

The scale-beam is divided into two members, $h$ $i$, for weights of different denomination, and may have three or more members, if desired.

The pivots I of the short arm of lever J are connected with levers G similarly to the connection of pivots F with legs E, and pivots K are alike arranged in hanger L—that is to say, they are so fixed that when the platform is lowered and the links O drop away from under pivots H pivots F will rest on pins N', the long arms of the levers G will be suspended upon the upper sides of pivots I, (see Fig. 4,) and lever J will drop from the bearings in hanger L off the knife-edges of its pivots, so that all the lever-pivots will be entirely out of contact with anything when not in weighing condition, and thus will be protected from wear by the jolting of the wagon. The platform D has sides $j$ and ends $k$ hinged to it for side and end boards of the wagon-box, and also to serve for widening and lengthening the platform when placed on the ground, so that a wagon may be drawn upon it for being weighed, the sides being suitably braced up level from the platform. We propose in practice to apply one or more spirit-levels to the platform D, by which to see that the wagon supports it in level position before weighing, to secure exactness of weight.

Having thus fully described our invention, what we claim as new, and desire to secure by Letters Patent, is—

1. The platform D, provided with weighing-levers and a weigh-beam, and said weighing-levers suspended by cranked rods Q, and a bed-frame, A, on the running-gear of a wagon, substantially as specified.

2. The cranked rods Q, having knife-edge cranks P and eccentric extension U, in combination with a wagon-bed, A, weighing-levers G, links O, leg-rests E, and platform D, substantially as specified.

3. The weighing-levers G, suspended in leg-rests E by pivots F and pins N, and connected to pivots I of lever J, to be suspended on said pins N and on the upper sides of pivots I when disarranged for weighing, substantially as specified.

4. The cranked rods Q, having cranks R and the pins V and W, in combination with cranks P, eccentric projection U, weighing-levers G, platform D, and bed-frame A, substantially as specified.

5. The combination, with weighing-platform D and weighing apparatus arranged for application to a wagon, as described, of sides and ends $j$ $k$, hinged to said platform for use as a wagon-box and for extending the platform, substantially as and for the purpose specified.

DANIEL J. NORRIS.
   LUCIUS D. NORRIS.

Witnesses:
 HOBART R. NORRIS,
 JACOB C. NORRIS.